United States Patent [19]

Peterson

[11] Patent Number: 4,812,096
[45] Date of Patent: Mar. 14, 1989

[54] SELF-TIGHTENING NUT

[76] Inventor: Peter O. Peterson, 28 Woodside Way, Ross, Calif. 94957

[21] Appl. No.: 131,577

[22] Filed: Dec. 11, 1987

[51] Int. Cl.[4] .......................... F16B 39/12; E04C 3/10
[52] U.S. Cl. .................................... 411/231; 411/433;
29/446; 29/525.1; 52/227
[58] Field of Search ...................... 411/1, 8–12,
411/231, 432, 433, 289, 544, 980, 981, 994;
29/446, 526 R; 403/146, 166; 52/227

[56] References Cited

U.S. PATENT DOCUMENTS

| 518,165 | 4/1894 | Thalaker | 411/231 |
| 560,554 | 5/1896 | Wiestner | 411/981 X |
| 581,551 | 4/1897 | Green | 411/231 |
| 1,205,256 | 11/1916 | Pearson | 411/994 X |
| 4,479,747 | 10/1984 | Pagel | 411/8 |

FOREIGN PATENT DOCUMENTS

| 706586 | 12/1979 | U.S.S.R. | 403/166 |
| 1099472 | 1/1968 | United Kingdom | 411/11 |

Primary Examiner—Neill R. Wilson
Attorney, Agent, or Firm—Owen, Wickersham and Erickson

[57] ABSTRACT

A fastener device for automatically maintaining a tightening torque on a threaded structural member under stress which would otherwise become loose when the stress is reduced. The device comprises a first nut member, a second nut member axially aligned with the first nut member and a coiled spring connected at its opposite ends between the first and second nut members. When the nut members are threaded to the first and second nut members and the second nut member is turned and held, as by a stop means, torsional energy is stored in the spring and later becomes available to automatically turn and tighten the first nut member, wherever it becomes loose.

5 Claims, 2 Drawing Sheets

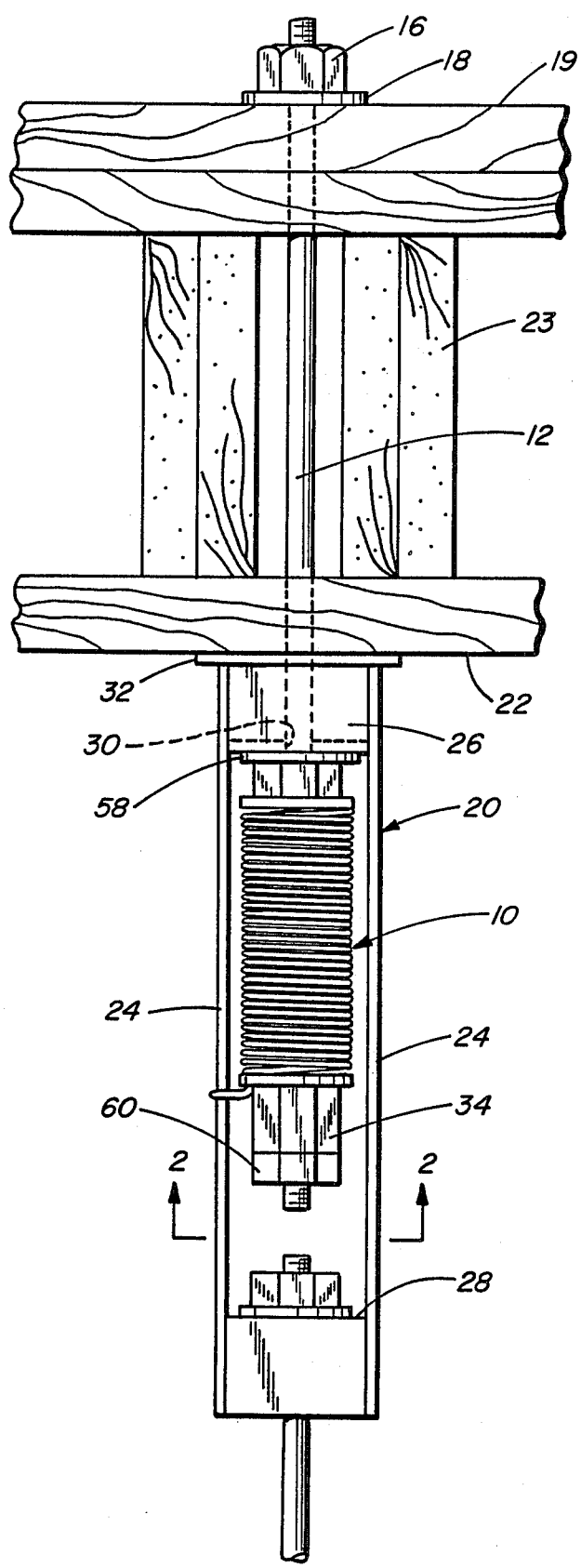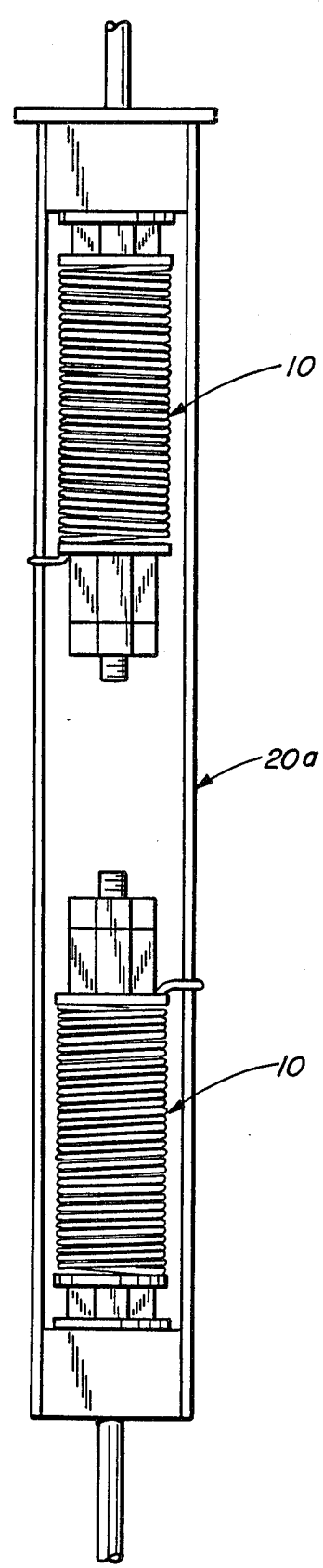
FIG._1    FIG._1A

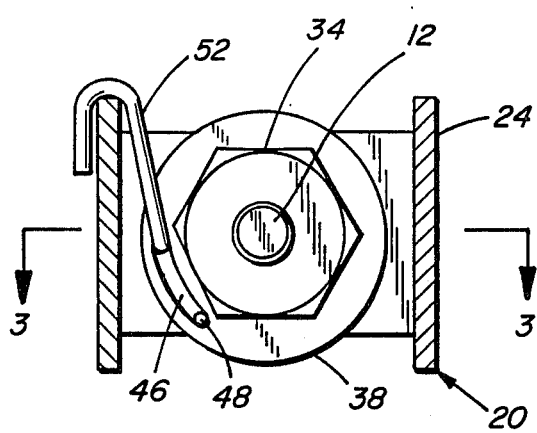
FIG._2
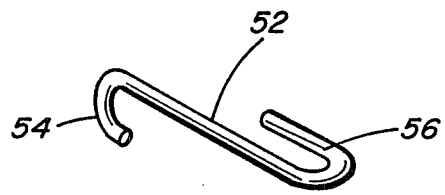
FIG._4
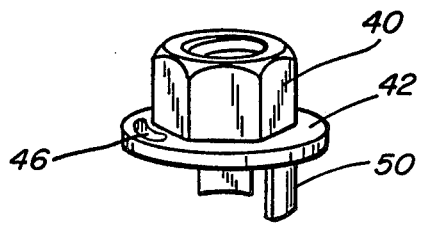
FIG._5
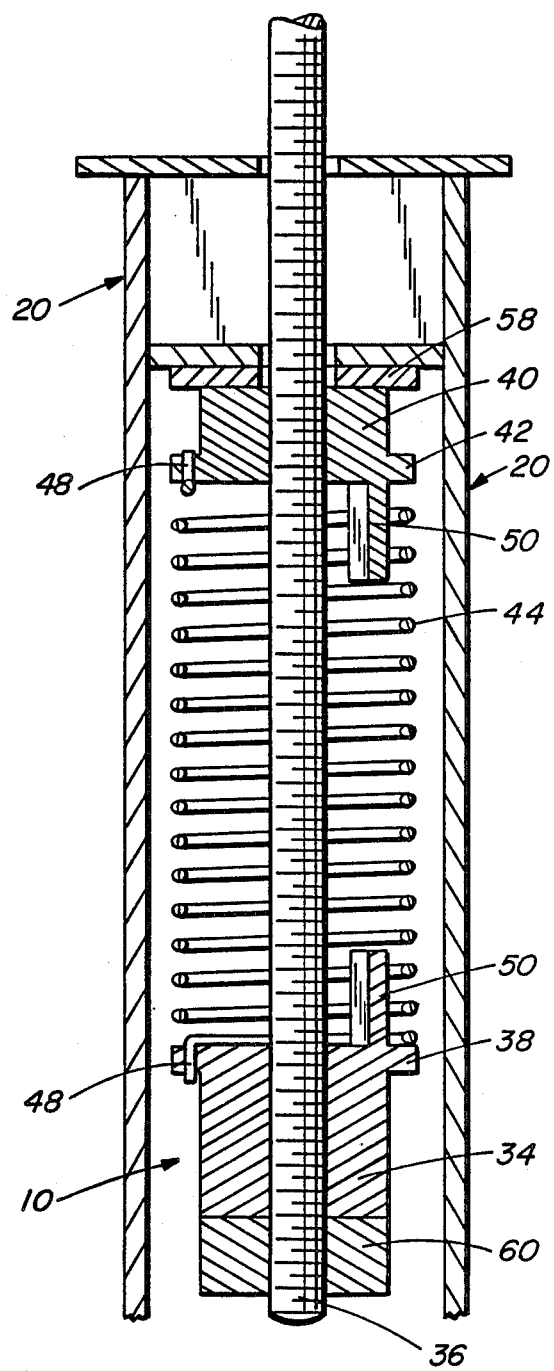
FIG._3

SELF-TIGHTENING NUT

BACKGROUND OF THE INVENTION

This invention relates to threaded fasteners and more particularly to a fastener assembly that automatically maintains self-tightening force after its installation.

Many types of structural arrangements, utilize threaded type fasteners, such as common hex nuts in combination with bolts, tie-rods and the like to maintain structural integrity. Although the nuts may be originally installed and tightened with an adequate amount of torque, there are often extraneous forces or conditions affecting the installation which can either cause the nut to become loose or require additional take-up turning in order to maintain the intended bolt or rod tension and thus the integrity of the installation.

To further complicate the problem, the forces or conditions causing the loosening or tension reducing condition may occur over a period of time and be inherently difficult to detect without an elaborate monitoring or checking system. Moreover, in many structural installations the nuts which may tend to loosen or require tightening over a period of time are located in totally inaccessible or difficult to reach places within a structure.

One example of the need for such a self tightening nut type fastener occurred with respect to a structural tie-rod strengthening system for wooden buildings such as described in United States patent application Ser. No. 000,707, filed Jan. 6, 1987, and assigned to the owner of the present invention. In such tie-rod installations, the threaded nut fasteners were initially tightened with a high level of torque to place the tie rods in tension between wooden structural members. Such installations were often made in new buildings where the construction lumber was relatively green. Over a period of time the green lumber underwent a normal shrinkage which caused the tie-rods to lose tension and their fastener nuts to become loose. Such conditions greatly reduced the strengthening effectiveness of the tie-rod system on the building particularly during high stress conditions such as produced by heavy wind or earthquake loads. To alleviate this potential danger on the aforesaid and other structural arrangements, it was necessary to provide a nut type fastener for a threaded body that would automatically tighten itself if, for some reason, the resisting force decreased or a looseness occurred with the threaded connection.

A general object of the present invention is to provide a self-tightening fastener device that solves the aforesaid problem.

Another object of the invention is to provide a self-tightening fastener device that is relatively easy to install even in space limited situations and without the need for highly skilled labor or complicated tools.

Still another object of the present invention is to provide a self-tightening fastener that utilizes stored potential energy to maintain a take-up torque for an extended period of time and will automatically respond to any tendency of the fastener to loosen after initial installation.

Another object of the invention is to provide a self tightening fastener device that is particularly well adapted for ease and economy of manufacture.

BRIEF SUMMARY OF THE INVENTION

In accordance with the principles of the present invention a device is provided for automatically maintaining a take-up or tightening torque on a nut fastener attached to a threaded bolt or tie-rod. In broad terms, the device 10 comprises a nut-type fastener at one end which is adapted to be threadedly attached to a threaded body such as a bolt or tie-rod. An axially aligned driver nut is spaced from the nut fastener at the other end of the device and between the two threaded nuts is an energy storage means such as a coiled spring that provides an output torque in the tightening direction. Thus, when torque is applied to the driver nut, the torsional energy is first stored in the intervening storage means and is then transmitted to the driven nut. As long as the driven nut remains tight against its resistance on the threaded body the energy supplied will remain within the energy storage means. If the driven nut fastener becomes relatively loose on its threaded body the energy from the storage means will be automatically transmitted therefrom to exert a tightening torque on the driven nut. The self tightening fastener device is applicable to a variety of structural arrangements. It is particularly adaptable for use on tie-rods for strengthening wooden structures where normal shrinkage of structural components may cause a loosening on tie-rod fasteners over a period of time. When such loosening tends to occur, the device according to the present invention automatically exerts the necessary tightening torque to take up and eliminate the looseness and thereby maintain maximum structural integrity. The self-tightening device is preferably used in combination with a suitable coupler means at the end of a tie-rod which retains the device and also provides a bearing surface against the wooden structural member.

Other objects, advantages and features of the invention will become apparent from the following detailed description of one embodiment thereof presented in conjunction with the accompanying drawing.

BRIEF DESCRIPTION OF THE DRAWING

FIG. 1 is a view in elevation showing a self tightening device according to the invention as it appears when installed on a strengthening tie-bar for a building structure.

FIG. 1A is a view in elevation showing another tie-bar installation utilizing a pair of self-tightening fastener devices according to the invention.

FIG. 2 is a view in section taken along the line 2—2 of FIG. 1.

FIG. 3 is a view in section of a self-tightening device according to the invention as it appears before being tightened into the stored energy condition.

FIG. 4 is a view in perspective of the retaining member for the self-tightening device of FIG. 1.

FIG. 5 is a view in perspective of a driver head member for the self-tightening device of FIG. 1.

DETAILED DESCRIPTION OF EMBODIMENT

With reference to the drawing, FIG. 1 shows a self-tightening fastener device 10 as it appears when typically used in combination with a tie rod 12 for a structural system. Such a structural system is described in detail in the aforesaid co-pending United States patent application. Briefly, the structure system comprises a series of such tie rods which extend vertically between floors of a wooden building structure to afford it increased strength and rigidity, and therefore greater durability when subjected to high wind or earthquake loads.

In a typical installation, one end of the tie rod 12 is connected to a conventional hex nut 16 and a washer 18 which bears against an upper wood surface 19. The other end of the tie rod is connected to a suitable coupler device 20 which bears against a bottom wood surface 22 and retains the self-tightening fastener device 10. For purposes of illustration, the tie-rod shown is relatively short, but for many installations in a building system, the tie-rod may extend between two floors of the building structure. Initially the fasteners 10 and 16 are torqued to a relatively high level so that the end of the coupler 20 is pressed firmly against the wood surface 22, and the tie rod 12 is maintained under tension. Over a period of time after the initial installation of the tie rods, natural shrinkage which normally occurs in the wooden structural members of the building, such as the joist members 23 between the surfaces 19 and 22, may tend to relieve the tension of the tie-rods to the point where the nut fasteners at opposite ends become loose. In event of an earthquake, such loose tie-rods could greatly reduce the rigidity and strength of the building thereby increasing its vulnerability to structural failure by allowing an excess of flexibility that would cause cracks and other damage to the building walls. This problem is eliminated by the self-tightening fastener device 10 which provides constant take-up torque that maintains tie-rod tension and prevents any fastener looseness from occurring.

The coupler device 20 for retaining the device 10 at one of end of a tie rod may have various configurations. Essentially, what each coupler provides is a bearing surface surrounding the threaded tie rod for supporting the fastener device. For use with the embodiment of the invention described herein, the coupler 20 has a pair of spaced apart rigid side plates 24 connected (as by welding) at opposite ends to a pair of U-shaped brackets 26. The bight 28 of each bracket has a hole 30 through which the threaded tie rod 12 can extend and the material around this hole provides the bearing surface for a threaded fastener or when used, the device 10 of the present invention. At one end of the coupler is a transverse end plate 32 which is adapted to bear against a wooden member (e.g. the surface 22) when the associated tie rod 12 is installed.

As also shown in FIG. 3 wherein the device 10 is in its relaxed state, the self-tightening fastener device 10 comprises a driver nut 34 having internal threads that engage the external threads 36 of a bolt or tie rod 12. The driver nut is fixed (as by welding) to a circular plate 38 having a diameter substantially greater than the driver nut. Spaced from the driver nut 34 on the threaded bolt or tie-rod is a driven nut 40 which is similarly fixed to a plate 42. Located between the driver nut 34 and the driven nut 40 is a coiled torsion spring 44. This spring is preferably made of a suitable hard steel wire (e.g. ASTM A228) with a plurality of coils of equal diameter. When a spring made of such a material and having around 38–40 coils of around 2.5 inches in diameter is torqued for 7 turns from its relaxed state, it will produce around 50 inch-pounds of torque on the driven nut fastener 40. As the input torque is applied to the nut fastener 34, the spring coils for a spring as described will compress from around 0.5 to 0.7 inches in length. The specific material, number and diameter of coils and torque input can of course be varied to provide varied output characteristics for different applications of the device 10.

Each of the circular plates 38 and 42 for the two nuts, as shown in FIG. 5, is provided with an elongated slot 46 for retaining a bent end portion 48 of the spring. Also, each circular plate has at least two spaced apart tab members 50 that extend axially and thus parallel to the central axis of the plate and its attached nut. These tab members are equally spaced from the outer edge of the circular plate and provide guide means for maintaining the concentricity of the spring coils at opposite ends of the spring.

As shown in FIG. 2 a retainer member 52 in the form of a piece of heavy stiff wire (e.g. 0.125 Dia. ASTM A228), is connected to the circular plate 38 for the driver nut 34. This member prevents the driver nut 34 from backing off once it has been torqued to tighten the spring 44, and thereby exerting a tightening force on the driven nut 40. In the form shown in FIG. 4, the retainer member 52 has a bent portion 54 at one end that fits within the slot 46 of the circular plate 38 for the driver nut 34. The other end of the stop member has a somewhat larger bent portion 56 that extends in a direction approximately 90° to the bent portion 54 and with a sufficient angular bend to fit around or against a suitable piece of adjacent structure such as one side plate 24 of the coupler 20.

In a typical application of the present invention, for example when used with a structural tie rod strengthening system for wooden buildings, the self-tightening device 10 is attached to one end of each threaded tie-rod 12. In such an installation, a suitable coupler 20 is first positioned with the threaded end of a tie rod extending through the bight of an internal bracket 26. Now, the assembled device 10 is attached to the end of the tie rod 12 and is threaded on to it. The inner or driven nut 40 is taken up so that it is tight against a washer 58 on the bight 28 of the coupler bracket 26. Thus, at this point, the coupler end plate 32 is held firmly against the wooden structure 22, as shown in FIG. 1. At this point, torque is applied to the outer driver nut 34 of the device 10 which turns its attached plate 38 that is also connected to the end of the coiled spring 44. This causes the spring coils to move closer together and tighten, thereby storing torsional energy in the spring. When the maximum amount of torque has been applied to the driver nut 34, the retainer member 52 is inserted in place with one end in the slot 46 of the driver plate 38 and its other hooked end portion 56 bearing against the side edge of the coupler 20. At this point a locking nut 60 may be treaded to the tie rod 12 over the nut 34.

After the device 10 has been installed as described with the energy storing spring 44 in its "wound-up" condition, the driven nut 40, attached to the other end of the spring will react to any reduction in force against the end of the coupler. Thus, if the wooden members in the structure adjacent the coupler should commence to shrink over a period of time, the normal tendency would be for the surface 22 of the wooden structure to move away from the coupler end plate. However, as soon as this occurs, the device 10 will sense the tendency to loosen, and the stored energy within the spring 44 will cause the driven nut 40 to rotate on the tie-rod and thereby automatically take-up threads and thereby eliminate any looseness. At some point, the maximum amount of wood shrinkage is reached, but this will normally occur long before all of the stored energy in the spring has been exhausted. thus, in a tie-rod strengthening installation of a wooden building, the integrity of the tie-rod system is always maintained. As shown in FIG. 1A the device 10 may be used at either end of a tie rod 12 in a building strengthening system and a coupler 20a of increased size may be provided to accommodate adjacent fastener devices 10.

Although the device 10 has been shown to be particularly useful for use with a tie-rod strengthening system, it should be apparent that it may have many other applications with or without a coupler 20 wherein it is necessary or advantageous to provide for automatic tightening of a nut type threaded fastener which, for some reason might tend to loosen due to extraneous conditions or forces.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A self-tightening fastening device adapted to be mounted on a threaded end of a body which is anchored at its other end, said threaded end extending through a surrounding bearing surface, said device comprising:
   a first rotatable means threawded to said body and adapted to bear against said surrounding surface;
   a second rotatable means threaded to said body and spaced from said first rotatable means therein, said first and second rotatable means each comprising a nut with internal threads fixed to a washer means;
   a coiled spring having a plurality of coils, the opposite end portions of said spring being connected to said washer means of each said rotatable means;
   and stop means for preventing the rotation of said rotatable means in one direction, said stop means comprising a link of stiff wire having one end connected to the washer means of said second rotatable means having a bent portion at its other end adapted to engage a structural member adjacent to said device;
   whereby torsional force applied directly to said second rotatable means is stored as potential energy in said storage means and transmitted as take-up torque to said first rotatable wherever it tends to loosen on said threaded body.

2. The fastening device as described in claim 1 wherein said washer means for said second rotatable means has a slot for receiving and retaining one end portion of said spring and also one end of said stop means.

3. The fastening device as described in claim 1 wherein said washer means for each said rotatable means includes axially extending guide means for maintaining concentricity of end coils for said spring.

4. The fastening device as described in claim 3 wherein said guide means on said rotatable means comprises at least two spaced apart tab members.

5. In combination with a strengthening system for wood framed building comprised of vertical structural members and members transverse to said vertical members said system including tie rods extending between pairs of vertical structural members and interconnected by couplers, each said tie rod being initially fastened at both ends, so as to bear against a transverse member to compressively restrain said vertical structural members at preselected locations, a self-tightening fastener device attached to one threaded end of said tie rod comprising:
   a first rotatable means threaded to said tie rod and adapted to bear against a coupler for said tie rod;
   a second rotatable means spaced from said first rotatable means, and also threaded on said tie rod;
   a coiled spring extending between and having opposite end portions connected to said first and second rotatable means;
   stop means for preventing rotation of said second rotatable means in one direction;
   whereby torsional force applied to said second rotatable means is stored in said coiled spring and is transmitted as take-up torque to said first rotatable means to maintain the compression force on said vertical structural members.

* * * * *